United States Patent
Chen et al.

(10) Patent No.: US 8,295,712 B2
(45) Date of Patent: Oct. 23, 2012

(54) OPTICAL DEVICE AND METHOD FOR OPTICAL FREQUENCY MODULATION TO OPTICAL AMPLITUDE MODULATION CONVERSION

(75) Inventors: Young Kai Chen, Berkeley Heights, NJ (US); Mahmoud Rasras, Berkeley Heights, NJ (US)

(73) Assignee: Alcatel Lucent, Paris (FR)

( * ) Notice: Subject to any disclaimer, the term of this patent is extended or adjusted under 35 U.S.C. 154(b) by 438 days.

(21) Appl. No.: 12/615,439

(22) Filed: Nov. 10, 2009

(65) Prior Publication Data

US 2011/0064419 A1    Mar. 17, 2011

Related U.S. Application Data

(60) Provisional application No. 61/242,216, filed on Sep. 14, 2009, provisional application No. 61/242,009, filed on Sep. 14, 2009.

(51) Int. Cl.
*H04B 10/06* (2006.01)

(52) U.S. Cl. ........ 398/202; 398/212; 398/204; 398/207; 398/213; 398/188; 385/14; 385/27; 385/39; 385/32

(58) Field of Classification Search .................. 398/202, 398/183, 188, 147, 158, 159, 161, 208, 203, 398/204, 205, 206, 207, 212, 213, 214, 200, 398/201, 83, 84, 85, 87, 209, 210, 211, 81; 385/1, 8, 27, 39, 50, 122, 24, 37, 14, 15, 385/3, 32

See application file for complete search history.

(56) References Cited

U.S. PATENT DOCUMENTS

| | | | |
|---|---|---|---|
| 7,555,227 B2 * | 6/2009 | Bontu et al. | 398/202 |
| 2010/0021179 A1 * | 1/2010 | Kikuchi | 398/183 |

* cited by examiner

*Primary Examiner* — Hanh Phan
(74) *Attorney, Agent, or Firm* — Hitt Gaines, PC (57) ABSTRACT

An optical device comprising an optical device comprising a Mach-Zehnder interferometer having a first 2×2 optical coupler, a second 2×2 optical coupler, a first optical arm, and a second optical arm. The first and second arms connecting corresponding pairs of optical ports of the first and second 2×2 optical couplers. The second optical arm has a longer optical path than the first arm. The device also comprises one or more optical resonators optically coupled to the first optical arm and an optical splitter. The optical splitter is coupled to deliver a portion of an input optical signal to one port of the first 2×2 optical coupler and to deliver a remaining portion of the input optical signal to one port of the second optical coupler.

21 Claims, 4 Drawing Sheets

OPTICAL DEVICE AND METHOD FOR OPTICAL FREQUENCY MODULATION TO OPTICAL AMPLITUDE MODULATION CONVERSION

TECHNICAL FIELD

This application claims the benefit of U.S. Provisional Application Ser. No. 61/242,216, filed on Sep. 14, 2009 to Young-Kai Chen, et al., entitled "OPTICAL DEVICE AND METHOD FOR LINEAR OPTICAL FREQUENCY MODULATION TO OPTICAL AMPLITUDE MODULATION CONVERSION," and also claims benefit of U.S. Provisional Application Ser. No. 61/242,009 filed on Sep. 14, 2009 to Young-Kai Chen, et al. entitled "OPTICAL DEVICE AND METHOD FOR LINEAR OPTICAL FREQUENCY MODULATION TO OPTICAL AMPLITUDE MODULATION CONVERSION," commonly assigned with this application and incorporated herein by reference.

TECHNICAL FIELD

The present disclosure is directed, in general, to optical receivers and more specifically, optical demodulators for optical receivers, and, methods of using the same.

BACKGROUND

This section introduces aspects that may be helpful to facilitating a better understanding of the inventions. Accordingly, the statements of this section are to be read in this light. The statements of this section are not to be understood as admissions about what is in the prior art or what is not in the prior art.

Telecommunication over long distances (e.g., several km or longer) can be facilitated by up-converting a radio-frequency (RF) signal into an optical signal, transferring the optical signal over a long distance (e.g., via an optical fiber) and then down-converting the optical signal back to a RF or other signal.

SUMMARY OF THE INVENTION

One embodiment is an optical device comprising a Mach-Zehnder interferometer having a first 2×2 optical coupler, a second 2×2 optical coupler, a first optical arm, and a second optical arm. The first and second arms connecting corresponding pairs of optical ports of the first and second 2×2 optical couplers. The second optical arm has a longer optical path than the first arm. The device also comprises one or more optical resonators optically coupled to the first optical arm and an optical splitter. The optical splitter is coupled to deliver a portion of an input optical signal to one port of the first 2×2 optical coupler and to deliver a remaining portion of the input optical signal to one port of the second optical coupler.

Another embodiment is a method of using an optical device. The method comprises sending a frequency-modulated coherent input optical signal to first and second tunable balanced Mach-Zehnder interferometers. The method also comprises transmitting the frequency-modulated coherent input optical signal from the first and second tunable balanced Mach-Zehnder interferometers to first and second arms of an imbalanced Mach-Zehnder interferometer. One or more all-pass tunable ring resonators are optically coupled to the first arm, and the second arm has a longer optical path than an optical path of the first arm. The method also comprises adjusting one or more of phase shifts, coupling strengths, or resonance frequencies of the one or more all-pass tunable ring resonators. The method also comprises adjusting a coupling strength of the first and second tunable balanced Mach-Zehnder interferometers. The method also comprises transferring an amplitude-modulated coherent output optical signal out of the first and second tunable balanced Mach-Zehnder interferometers. The amplitude-modulated coherent output optical signal is linearly related to the frequency-modulated coherent input optical signal.

BRIEF DESCRIPTION OF THE DRAWINGS

The embodiments of the disclosure are best understood from the following detailed description, when read with the accompanying FIGUREs. Corresponding or like numbers or characters indicate corresponding or like structures. Various features may not be drawn to scale and may be arbitrarily increased or reduced in size for clarity of discussion. Reference is now made to the following descriptions taken in conjunction with the accompanying drawings, in which.

DETAILED DESCRIPTION

Aspects of the present disclosure benefit from the recognition that the non-linear amplitude response of certain optical receivers having an imbalanced MZI are due to inherent second and third-order harmonic distortions in optical amplitude detection. It was further recognized as part of the present disclosure, that an optical response can be significantly linearized by providing an optical device with a tunable balanced MZI coupled to an imbalanced MZI and tunable all-pass optical filter (APF) which are also optically coupled to the imbalanced MZI. The amplitude response of the optical device may be adjustable to be substantially linear over a broad input frequency range.

Figure 1:
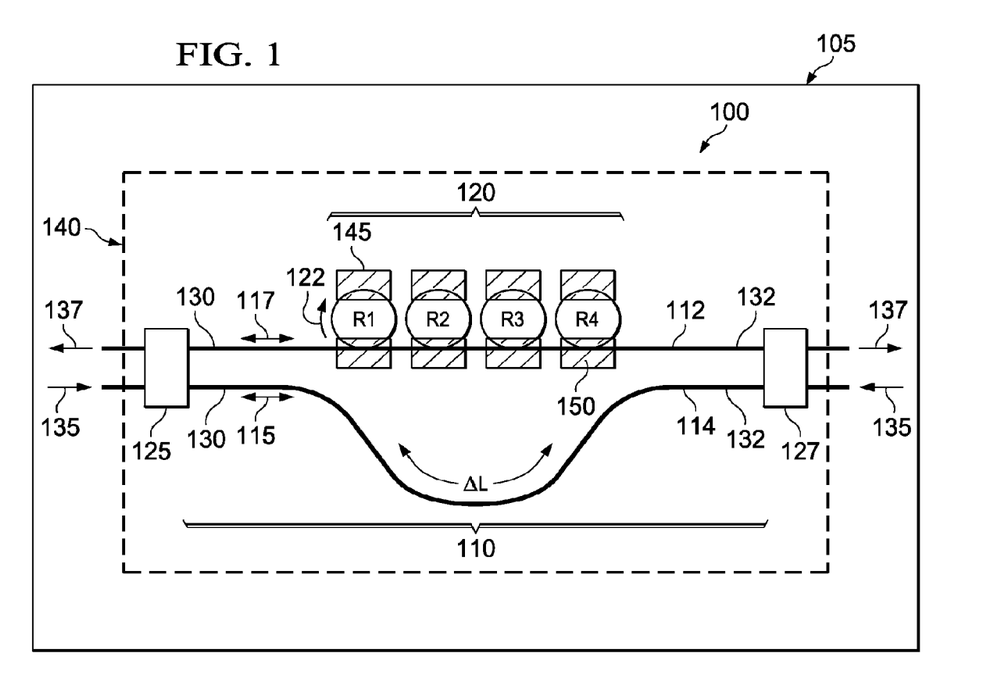
FIG. 1 presents an example optical device of the disclosure.

FIG. 1 presents an example optical device 100 of the disclosure. In some embodiments the optical device 100 is configured as a portion of an optical receiver. In some embodiments the optical device 100 is part of an optical receiver in an optical telecommunication system 105. One skilled in the art would be familiar with the variety of components (not shown) such as light sources, switches, modulators, amplifiers, filters and optical fibers that the optical telecommunication system 105 could include.

In one embodiment the device 100 comprises an imbalanced MZI 110 having a first arm 112 and a second arm 114. The second arm 114 has a longer optical path length than an optical path length of the first arm 112. The device 100 also comprises one or more optical resonators 120 optically coupled to the first arm 112, e.g., the optical resonators 120 may be all-pass tunable ring resonators. A feedback optical path length 122, e.g., an optical path length or a ring, of each of the optical resonators 120 is equal to or greater than a difference in length (ΔL) of the longer optical path 115 of the second arm 114 and the optical path 117 the first arm 112. The device 100 also comprises first and second 2×2 optical couplers 125, 127 (e.g., amplitude splitters/combiners, such as MZIs), e.g., 50/50 optical amplitude splitters. The 2×2 optical couplers 125, 127 couple to respective first ends 130 and second ends 132 of the pair of arms 112, 114. The imbalanced MZI 110 is configured so that the first and second 2×2 optical couplers 125, 127 output an amplitude-modulated coherent output optical signal 137 on one arm thereof in response to receiving a frequency-modulated coherent input optical signal 135 on other arms thereof.

In some embodiments, the imbalanced MZI interferometer 110, optical resonators 120 and 2×2 optical couplers 125, 127 can form an oFM discriminator filter 140 of the optical device 100, e.g., configured as an optical receiver.

Some embodiments of the device 100 are configured such that the amplitude-modulated coherent output optical signals 137 are substantially linearly related to the frequency-modulated coherent input optical signals 135.

Figure 2:
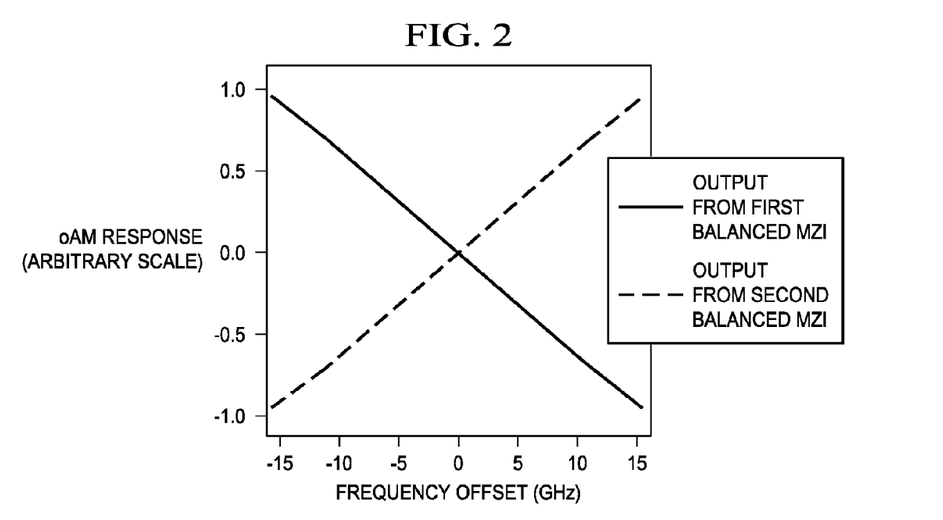
FIG. 2 presents an example linear amplitude response as a function of frequency for an optical device of the disclosure, such as the device depicted in FIG. 1.

FIG. 2 shows an example of a linear amplitude response that may be obtained for some embodiments of the optical device 100 depicted in FIG. 1. The figure shows that imbalanced MZI interferometer 110 may be configured so that the amplitudes of the output optical signals 137 are substantially linearly related to the frequency of modulation of the input optical signal and have respective positive and negative derivatives with respect to said frequency.

The term linearly related, as used herein refers to the modulation amplitude of the output signals 137 having a dependency on the frequency of modulation of the input optical signal 135 that is linear to an error of less that +/−5 percent at least about ±8 GHz and more preferably over at least about ±16 GHz, and in some cases, an error less that +/−0.005 percent.

In the MZI 110, the term imbalanced refers to the fact that the two optical arms 112, 114 of the MZI have different optical path lengths 115, 117. The selection of ΔL may provide a desired value of the free spectral range (FSR) of the device 100. For instance, selection of a large ΔL may provide a narrow FSR (e.g., about 10 GHz) while selection of small ΔL may provide a broad FSR (e.g., about 100 GHz). In some embodiments where the desired FSR is about 32 GHz, the first arm's path length is about 2 mm and the second arm's path length is about 3 to 4 mm so that ΔL equals about 1 to 2 mm.

In some embodiments, the waveguide portions of each optical resonator 120 can be in the shape of a ring, such as the four same-sized rings R1 through R4, as illustratively depicted in FIG. 1. In cases where the ring resonators 120 have a circular optical path, the feedback optical path length 122 is about equal to the circumference of the ring. In some embodiments, however, the ring resonator 120 can have non-circular shapes (e.g., ellipsoidal) and can have different sizes.

In some embodiments, each optical resonator 120 is separately coupled to the first arm 112 of the imbalanced MZI 110. Separate coupling of the optical resonators 120 to the first arm 112 can simplify the tuning of the ring resonators 120 to achieve the above-described linear relationship between output amplitude modulation and input frequency modulation of optical signals.

In some cases, the choice of the number of optical resonators 120 to use in the device 100 is a balance between several factors. One factor is achieving a desired linearity between the output amplitudes and the input modulation frequencies over a desired broad frequency range. Another factor is reducing the space or footprint of the optical resonators 120 and the size of the device 100 in general. A third factor is the more complex control process associated with precisely tuning multiple optical resonators 120. In some cases, for instance, increasing the number of optical resonators 120 in the device helps to achieve the linear response over a broad frequency range. For example, in some cases, the use of four to six optical ring resonators 120 separately, which are optically coupled to the first optical arm, helps provide a substantially linear response over a frequency range of about 32 GHz or more. In other cases two to three optical resonators can be sufficient to achieve a substantially linear response over a frequency range of about 16 GHz or less.

In some embodiments, a second sequence of one or more the optical resonators 120, e.g., all-pass tunable ring resonators, an be optically coupled to the second optical arm 114 of the imbalanced MZI 110. However, other considerations, such as the desire for a compact device 100 and the more complex control processes needed to achieve a substantially linear amplitude response may limit the desirability of such embodiments.

As shown in FIG. 1, in some embodiments, each of the resonators 120 are all-pass tunable ring resonators having a phase shifter 145 and tunable coupler 150. For instance, the phase shifter 145 can be a thermo-optic phase shifter, although other types of phase shifters well know to those skilled in the art could be used (e.g., electro-optic phase). For instance, the tunable coupler can be a tunable balanced MZI configured with a tunable phase shifter (e.g., a thermo-optic controllable phase shifter) in one of its arms (not shown).

Configuring the feedback optical path lengths 122 of the optical resonators 120 to be equal to or greater than ΔL may facilitate configuring the device 100 to have the above-described substantially linear amplitude response to the frequency modulation of the input optical signals. In some embodiments, the feedback optical path length 122 of each optical resonator 120 is about twice the ΔL. In other embodiments, the feedback optical path length 122 can be, e.g., about 1.5, 2.5, 3, . . . times the ΔL.

Some embodiments of the optical resonators 120 permit the passage of all optical frequencies, that is, all frequencies in the FSR, with the relative phase of output optical signals changing from 0 to 2π over the FSR.

In some embodiments, the FSR of the device 100 is configured to be less than or equal to about two times a linear bandwidth of operation of the device 100, that is, the frequency range over which the above-described linear relationship applies. Such a configuration may facilitate configuring the device 100 for a linear amplitude response to a frequency modulation, which is centered on a selected frequency. For example if one wishes to have linearity over a 16 GHz band then, the output amplitude can be arranged have an approximate zero at the frequency at the center of the 16 GHz ban, and have a maximum absolute value at the edges of the 16 GHz band. In such configurations, it is sometimes desirable to chose ring resonators 120 that each have an FSR that is about half that of the FSR defined by the ΔL of the second arm 114.

The 2×2 optical couplers 125, 127 can be configured to compensate for optical losses in the optical resonators 120. For instance, one of the arms of each 2×2 optical coupler 127, 127 can include a phase shifter (not shown) which be used to adjust the sinusoidal phase response of the 2×2 optical couplers 127, 127, e.g., tunable balanced MZIs, to achieve such compensation.

Figure 3:
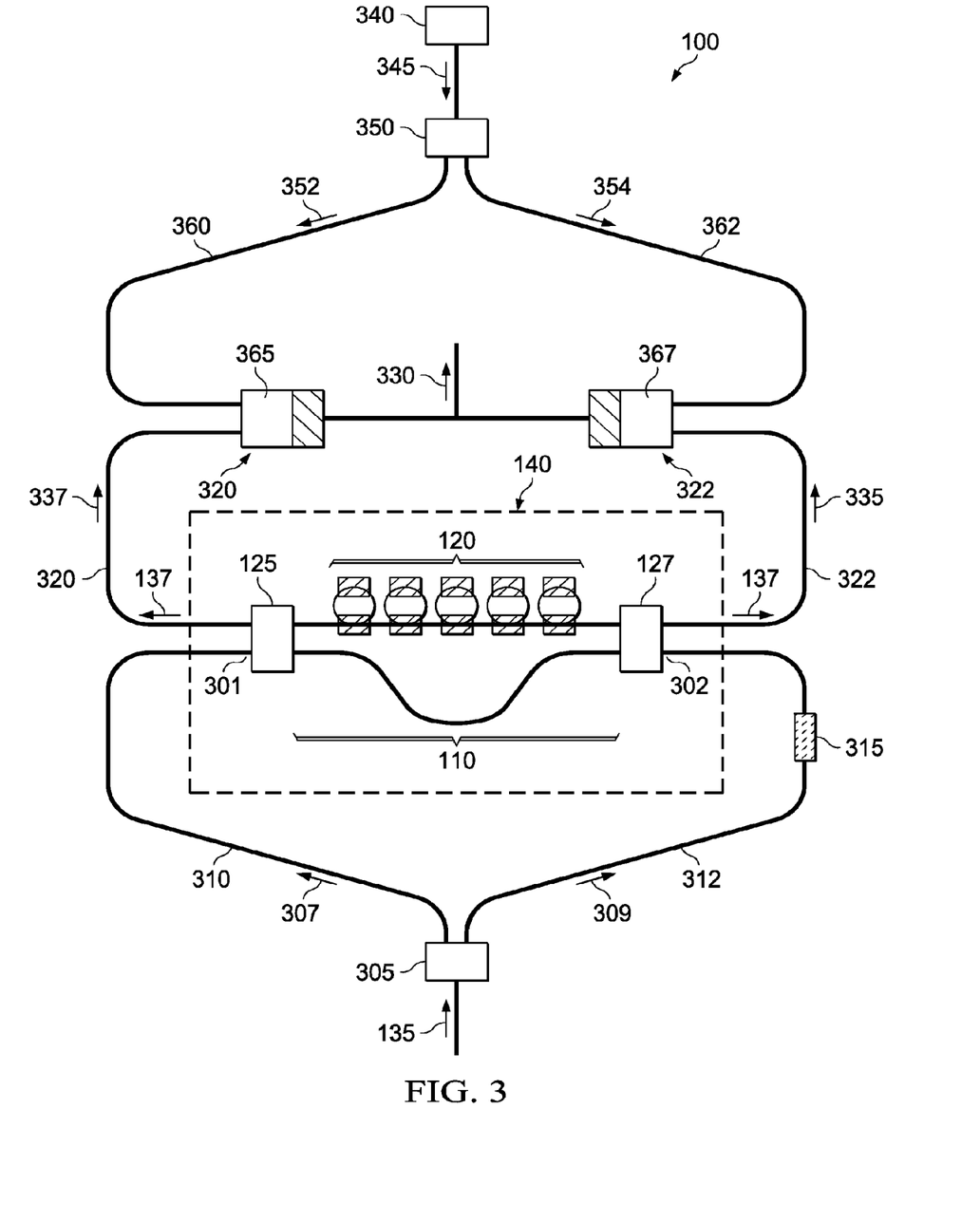
FIG. 3 present another example optical device of the disclosure.

FIG. 3 presents another example optical device 100 of the disclosure. In some cases the optical device 100 depicted in FIG. 3 can have any of the components of the device 100 of FIG. 1, (e.g., the imbalanced MZI 110 and the optical resonators 120) and the first and second 2×2 optical couplers 125, 127.

As illustrated in FIG. 3, the device 100 can further include a first optical beam splitter 305, e.g., a 50/50 power splitter. The first optical beam splitter 305 can be configured to divide the frequency-modulated coherent input optical signal 135 into two optical input signals 307, 309 of about equal power. Each of the optical input signals 307, 309 can be separately coupled to one of the 2×2 optical couplers 125, 127, e.g., through first and second input optical waveguides 310, 312, respectively. In some embodiments, the beam splitter 305 is a passive, e.g., 50/50 power optical beam splitter, although an active beam splitter could be used.

As further illustrated in FIG. 3, the device 100 can further includes an optical phase-shifter 315 (e.g., about a 180-degree phase-shifter or phase shifter such as pi/4 to 3pi/4 phase shifters) optically coupled to one of the input waveguides 312. In some embodiments the phase-shifter 315 is a thermo-optic phase shifter that can be set to provide a desired optical phase shift, although other types of phase-shifters such as electro-optic phase shifters can be used as well. The optical phase-shifter enables tuning the device 100 so that the two optical output signals from the imbalanced MZI have frequency responses with frequency-slopes of opposite sign. In some embodiments, as further discussed below the optical phase-shifter 315 also facilitates a balance detection process by appropriately shifting the relative phase of one of the input optical signals (e.g., signal 307) at the imbalanced MZI. The two input optical signals 305, 307 entering the first and second tunable balanced MZIs 125, 127 counter-propagate with respect to each other in the imbalanced MZI.

As further illustrated in FIG. 3, the device 100 can further include first and second photo-detectors 320, 322, e.g., a matched pair of photodiodes connected in a back-to-back manner. The first and second photo-detectors 320, 322 are each configured to receive the amplitude-modulated coherent output optical signal 137 from first and second output waveguides 325, 327 that are optically coupled to the first and second 2×2 optical couplers 125, 127. The photodetectors 320, 322 are configured to convert the amplitude-modulated optical signal 137 into an electrical current output signal 330. The electrical output signal 330 may have a voltage or current that is about proportional to the intensity of the amplitude-modulated optical signal 137. In some embodiments, the electrical current output signal 330 can be up-converted to a radio-frequency signal by other components of the telecommunication system 105 (FIG. 1).

In some cases, it is desirable to configure the device 100 as, or to include, a balance detection discriminator filter. The input signals 307, 309 are transmitted to the two the first and second 2×2 optical couplers 125, 127. The inputs of the imbalanced MZI 110 receives the first and second input optical signals 307, 309 with a relative phase shift due to the optical phase shifter 315. The relative phase shift is typically between π/4 and 3π/4 radians, is preferably between 3π/8 and 5π/8 radians, and is more preferably about π/2 radians.

One of the output optical signals (e.g., signal 307 in FIG. 3) has a positive slope, substantially linear dependency on modulation frequency of the input optical signal such as shown in FIG. 2. The other output optical signals (e.g., signal 307 in FIG. 3) has a negative slope, substantially linear dependency on the modulation-frequency of the input optical signal as also shown in FIG. 2. In response to passage through the filter 140, the first input signal 307 produces an output signal 335 with a positive slope, substantially linear amplitude response to the frequency-modulation of the input optical signal 307. In response to passage through the filter 140, the second input signal 309 produces an output signal 337 with a negative slope, substantially linear amplitude response to the frequency-modulation of the input optical signal 309. Thus two output signal 335, 337 are produced in a single signal filter 140, instead of, e.g., in two separate devices.

To facilitate configuring the device 100 as a balanced detection discriminator filter, the device 100 can further including a reference laser 340 configured to transmit a coherent reference optical signal 345 having a predefined or known reference frequency, e.g., about equal to the carrier frequency of the input signal 135. As shown in FIG. 3, a second beam splitter 350 (e.g., a passive or active splitter, such as a 50/50 optical power splitter or an appropriately oriented polarization beam splitter of the device 100 can split the reference signal 345 into two reference signals 352, 354, e.g., of about equal intensity. The coherent reference optical signal 345 (e.g., signals 352, 354), can be optically coupled (e.g., via waveguides 360, 362) to first and second optical mixers 365, 367, e.g., planar free-space optical regions or multi-mode interference devices, so that intensities of the mixed optical signals are detected in the first and second photo-detectors 320, 322, respectively. Thus, different portions of coherent reference optical signal 345 (e.g., signals 352, 354) are optically coupled to the different output optical signals 335, 337 in the first and second optical mixers 365, 367. The combined electrical signal 330 from the photo-detectors 320, 322 can be about proportional to the difference in the amplitudes of the output optical signals 335, 337 received by the optical mixers 320, 322.

In other embodiments, the optical device 100 comprising a Mach-Zehnder interferometer 110 having a first 2×2 optical coupler 125, a second 2×2 optical coupler 127, a first optical arm 112, and a second optical arm 114. The first and second arms 112, 114 connect corresponding pairs of optical ports 301, 302 of the first and second 2×2 optical couplers 125, 127. The second optical arm 114 has a longer optical path 115 than the first arm 112. The device 100 also comprises one or more optical resonators 120 optically coupled to the first optical arm 112 and an optical splitter 305. The optical splitter 305 is coupled to deliver a portion of an input optical signal 307 to one port 301 of the first 2×2 optical coupler 125 and to deliver a remaining portion of the input optical signal 309 to one port 302 of the second optical coupler 127.

In some cases, the optical splitter 305 can be configured to deliver the remaining portion 309 to the second 2×2 optical coupler 127 with a phase shift with respect to the portion 307 delivered to the first 2×2 optical coupler 125, the phase shift being between π/4 and 3π/4. In some cases, the feedback optical path length of each of the all-pass tunable ring resonators 120 can be about twice the difference in length 115 of the longer optical path of the second arm 114 and the optical path of the first arm 112. In some cases a free spectral range of the device 100 is less than or equal about two times a linear bandwidth operation of the device 100. In some cases, each of the all-pass tunable ring resonators 120 includes a tunable coupler 150 and a phase shifter 145 (FIG. 1). In some cases, four to five of the tunable ring resonators 120 are optically coupled to the first arm 112. In some cases a second set of one or more of the tunable ring resonators 120 are optically coupled to the second arm 114 (not shown).

In some cases, the device further includes a first beam splitter, the first beam splitter configured to divide the frequency-modulated coherent input optical signal into two the optical input signals, each of the optical input signals being separately coupled to one of the first and second tunable balanced Mach-Zehnder interferometers through first and second input waveguides. In some cases such a device further includes a 180 degree phase shifter optically coupled to one of the first or second input waveguides.

In some cases, the device 100 further includes first and second photo-detectors 320, 322, wherein the first and second photo-detectors 320, 322 are each configured to receive different portions of the amplitude-modulated coherent output optical signal 335, 337 from first and second output waveguides 320, 322. In some cases, the first and second photo-detectors 320, 322 are configured to generate an electrical output signal 330 that is proportional to the amplitude-modulated coherent output optical signals 335, 337. In some cases such a device 100 further include a reference laser 340 configured to transmit a coherent reference optical signals 345 having a predefined reference frequency to first and second optical mixers 365, 367 that are coupled to the first and second photo-detectors 320, 322, wherein different portions 352, 354 of the coherent reference optical signals 345 are optically coupled to the different portions of the amplitude-modulated coherent output optical signal 335, 337 transmitted to the first and second optical mixers 365, 367. In some cases, for such a device 100, a phase of the electrical output signal 330 changes as a function of a difference between the reference frequency of the reference optical signals 345 and a frequency of the amplitude-modulated coherent output optical signal 335, 337.

Figure 4:
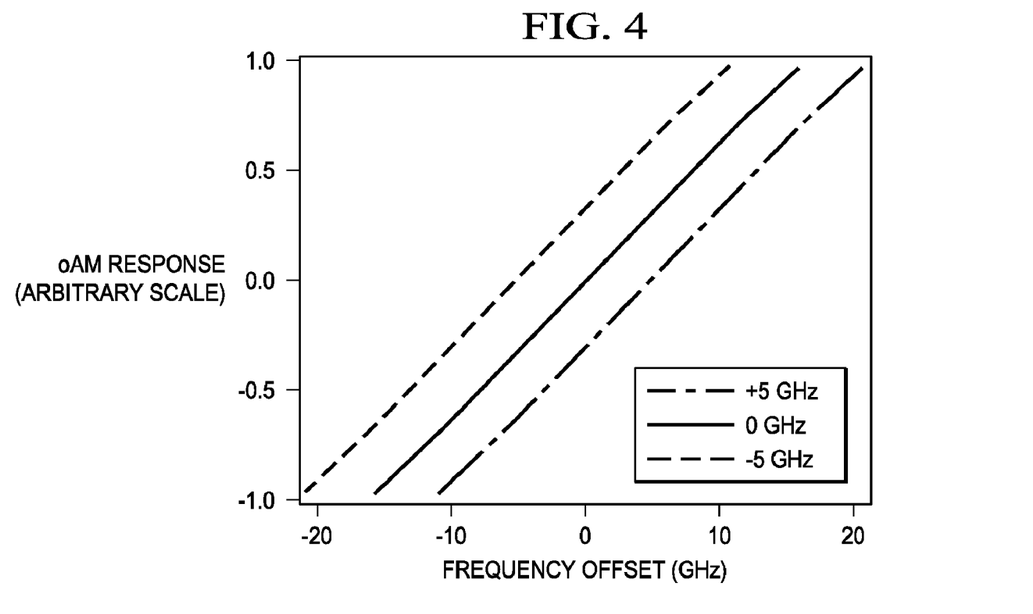
FIG. 4 presents an example linear amplitude response as a function of different offset frequencies for an optical device of the disclosure, such as the device depicted in FIG. 3.

FIG. 4 presents an example of a substantially linear amplitude response to optical modulation frequency of an input optical signal for an optical device, such as the device 100 depicted in FIG. 2. As illustrated in FIG. 4, for offset frequencies of ±5 GHz the oAM response remains a substantially linear function of the oFM over a broad frequency range (e.g., about 32 GHz). The device's 100 central frequency response can be tuned to various frequency offset locations, e.g., by adjusting the phase across the ring resonators 120 while still retaining the desired linear response.

Figure 5:
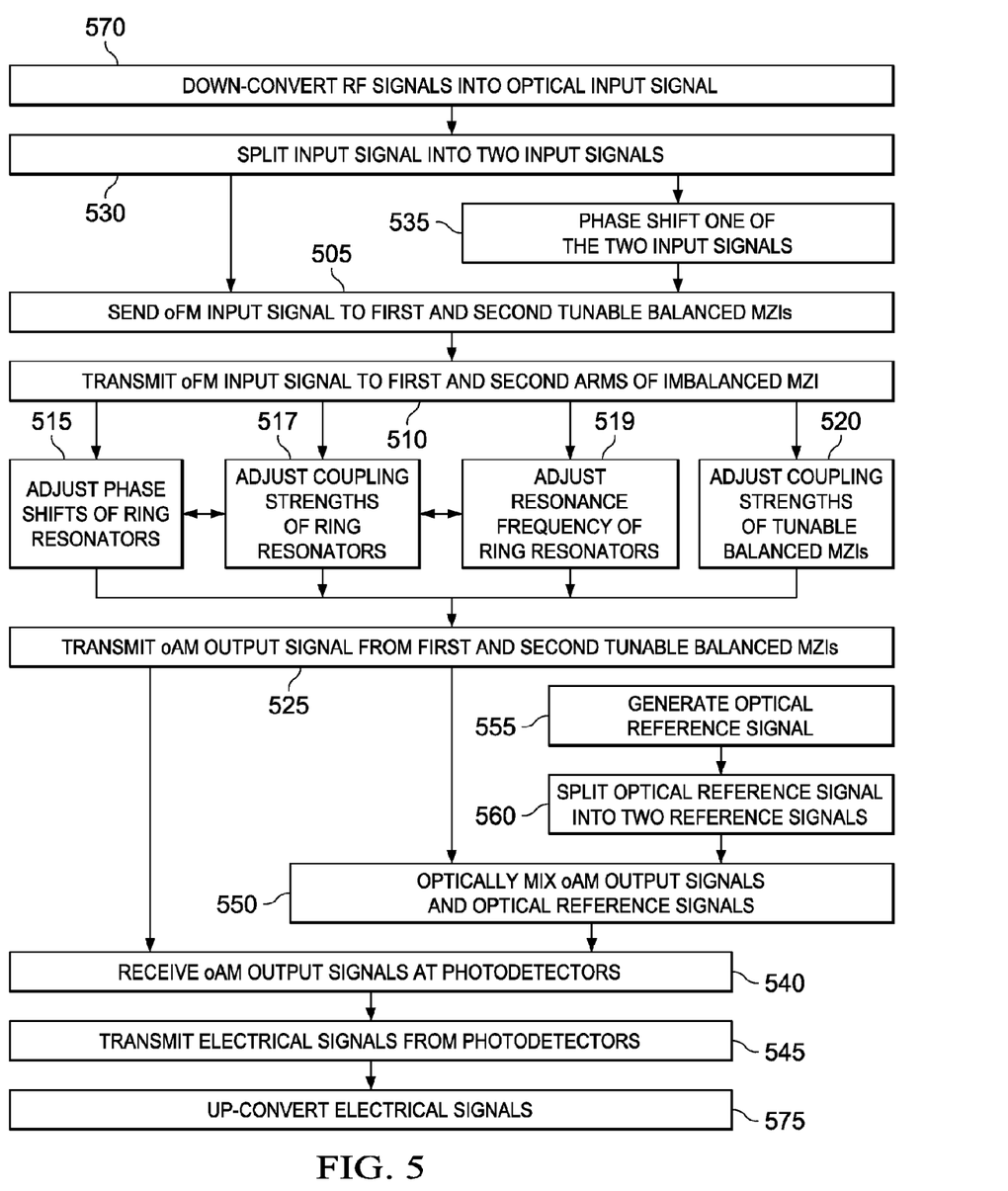
FIG. 5 presents a flow diagram of an example method of using an optical device of the disclosure, such as any of the devices discussed in the context of FIGS. 1-4.

Another embodiment of the disclosure is method of using an optical device. FIG. 5 presents a flow diagram of an example method of using an optical device such as any of the devices discussed in the context of FIGS. 1-4. With continuing reference to FIGS. 1 and 3, the method depicted in FIG. 5 comprises a step 505 of sending a frequency-modulated coherent input optical signal 135 (oFM input signal) to first and second 2×2 optical couplers 125, 127, e.g., with a relative phase difference. The method also comprises a step 510 of transmitting portions of the frequency-modulated coherent input optical signal 135 from the first and second optical couplers 125, 127 to first and second arms 112, 114 of an imbalanced Mach-Zehnder interferometer 110. One or more all pass tunable ring resonators 120 are optically coupled to the first arm 112 and the second arm has a longer optical path (e.g., longer by ΔL) than an optical path of the first arm 112.

The method also comprises adjusting one or more of phase shifts (step 515), coupling strengths (step 517), or resonance frequencies (step 519) of the one or more tunable ring resonators 120. In some embodiments, each of the tunable ring resonators 120 are adjusted independently of each other. The method further comprises a step 520 of adjusting a coupling strength of the first and second tunable balanced MZIs 125, 127. The method also comprises a step 525 of transmitting an amplitude-modulated coherent output optical signal 137 (oAM output signal) out of the first and second tunable balanced MZIs 125, 129. The amplitude-modulated coherent output optical signals can be linearly related to the frequency-modulated coherent input optical signal 137.

Different operational features of the above-described method steps are further discussed below. As part of step 510, in the second arm 114 where ΔL is located, the phase of the oFM is a linear function of frequency. E.g., the phase equals the frequency multiplied by a constant proportional to the light transmission delay imposed by ΔL. Also as part of step 510, in the first arm 112, which is optically coupled to the one or more ring resonators 120, the phase of the oFM can be a non-linear function of frequency. That is, the phase follows a non-linear function with respect to frequency that is defined by the optical characteristics of the combination of ring resonators 120. The optical signal 135 subject to the non-linear function corresponding to the first arm 112 is mixed (e.g., added to) with the optical signal 135 subject to the linear function corresponding to the second arm 112. Mixing occurs at the tunable balanced MZIs 120, 122. The tunable balanced MZI 120, 122 have a sinusoidal response with respect to the phase of the two signal 135 components in the first and second arms 112, 114. By adjusting the phase of the signal 135 in the first arm 112 (steps 515, 517, 519), mixing the phase of the signal 135 in the second arm 114 and applying the appropriate coupling strength function corresponding to tunable balanced MZIs 120, 122 (step 520), it is possible to produce the output optical signal 137 whose amplitude is a linear function of frequency over a desired frequency range.

In some embodiments, each of the ring resonators 120, preferably can be independently tuned, e.g., by each having a tunable ring interferometer. In some cases, by coupling the ring's interferometer to a phase shifter (e.g., thermo-optic phase shifter) one can change the phase (step 515), which in turn, can change the coupling strength (step 517) of the ring resonator 120. Adjusting the strength of the coupling (step 517) can in turn, also change the resonance frequency (step 519). Thus, shifting the phase in the ring resonator (step 515) can change resonance frequency of the ring resonator (step 519).

The tunable balanced MZIs used in step 520 facilitates tuning of the coupling ratio of the imbalanced MZI 110 and thereby help to compensate for optical losses (e.g., waveguide propagation losses) in the tunable ring resonators 120. This, in turn, can facilitate producing the above-discussed linear response. For instance, changing the phase in one arm 112, as part of step 520, allow routing of optical power to either fully the first 112, the second arm 114, or, any proportion in-between.

One skilled in the art would be familiar with the mathematical equations can describe the frequency-amplitude relationship for each component of the discriminator filter 140: the ring resonators 120, the tunable balanced MZIs 120, 125 and the imbalanced MZI 110. For instance, the relation between the signal amplitude (Amp) and its frequency (f) can be written as: $Amp = a_0 + a_1 f + a_2 f^2 + a_3 f^3$ Coefficient of the formulas for each of these components (e.g., $a_o$, $a_i$ ...) can be represented as elements in a transfer matrix. In a linear system behavior, the higher order coefficients $a_2$ and $a_3$ equal zero should be kept small and less than $10^{-6}$ in value. The transfer matrix can be entered into a computer equipped with the appropriate optimization software program to determine to value of the elements (or coefficients) that would provide a linear amplitude response as a function of frequency. From the optimization of matrix elements, one skilled in the art would understand how to determine the appropriate current to apply to, e.g., thermo-optic phase shifters that are coupled to the ring resonators, or the tunable balanced MZIs, to produce the desired linear response.

By way of example, consider an example device 100 configured with four ring resonators 120 that are separately optically coupled to the first arm 112 of the imbalanced MZI 110. The resonance frequencies of the four ring resonators 120 can be adjusted (step 519) to generate a continuous function because the frequency response in the first arm 112 is the composite of the responses of each of the four ring resonator 120. The composite response from the first arm 112 is combined with the linear response of the second arm 114 at tunable balanced MZIs 125, 127, to generate the desired linear amplitude versus frequency response.

Figure 6:
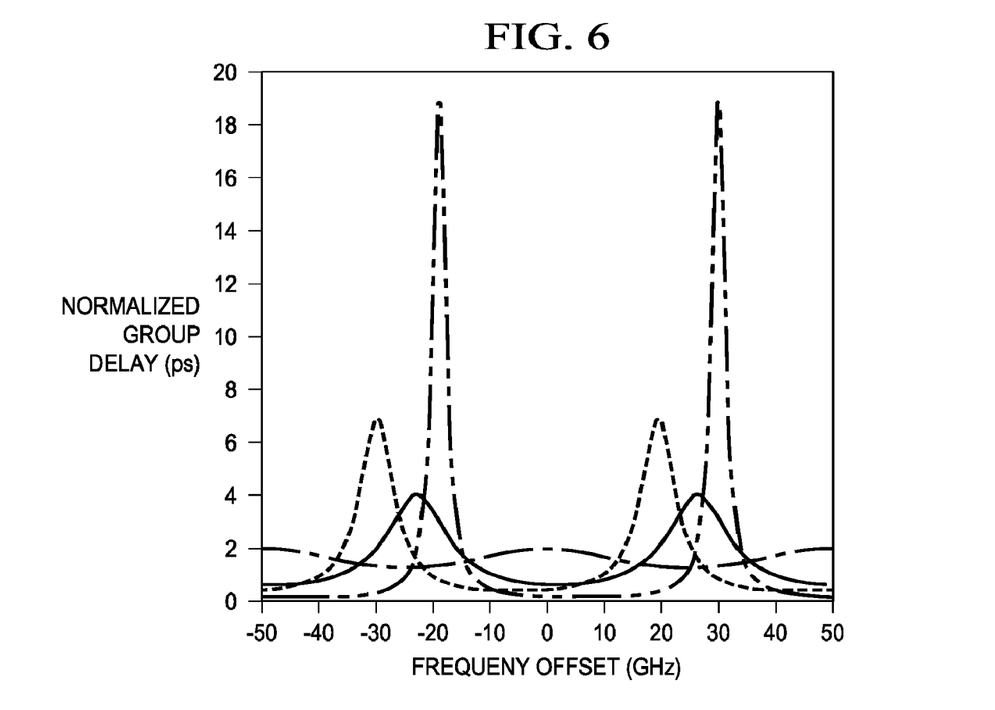
FIG. 6 illustrates plots of normalized group delays for four different ring resonators of an example device, such as the devices depicted in FIG. 1 or 3.

The phases of the ring resonators 120 can be adjusted (step 515) according to numerical or other optimization techniques. For instance, FIG. 6 illustrates plots of normalized group delays for four different ring resonators 120 coupled to the first arm 112. For the second arm 114, the group delay is constant. In some cases adjust the phases in step 515 includes configuring one ring 120 at low resonance at the central frequency, while the other rings 120 have relatively larger resonance characteristics which are asymmetrically distributed around the central frequency. Such as configuration can facilitate adjusting the phase at the edges of the desired frequency range to produce the desired linear response.

Continuing with the example, consider the case where the first and second balanced tunable MZIs 125, 127 have their coupling strength adjusted to 50/50 splitting (step 520) and ΔL=3 mm. To provide a linear amplitude response over ±16 GHz, the four ring resonators 120 can have optimized coefficients of 0.5308, 0.9938, 0.8994, and 0.7774, respectively, and phases of −1.1992, −3.1411, −1.4467, and −1.8961 radians, respectively.

Based upon the present disclosure one skilled in art would understand how other device 100 configuration could be adjusted to obtain the linear relationship for an input optical signal frequency range of at least about 16 GHz, and more preferably least about 32 GHz.

As also illustrated in FIG. 5, in some embodiments, the method further includes step 530 of splitting (e.g., via a using a passive beam splitter 305) the frequency-modulated coherent input optical signal 135 into two frequency-modulated coherent input optical signals 307, 309 prior to the sending step 505. In some embodiments, the method also includes a step 535 of phase shifting of one of the frequency-modulated coherent input optical signals 309 by 180 degrees prior to the sending step 505.

As also shown in FIG. 5, in some embodiments, the method further includes a step 540 of receiving different portions of the oAM coherent output optical signals 320, 322 at first and second photo-detectors 320, 322. In some embodiments in a step 545, the first and second photo-detectors 320, 322 transmit an electrical output signal 330 that is proportional to the oAM coherent output optical signals 320, 322.

As also shown in FIG. 5, in some embodiments, the method further includes a step 550 of optically mixing (e.g., via optical mixers 365, 367) the different portions of oAM coherent output optical signals 320, 322 with coherent reference optical signals 352, 354 prior to the transmission step 540 to the first and second photo-detectors 320, 322. As noted in the context of FIG. 3, optically mixing the output optical signals 320, 322 with coherent reference optical signals 352, 354 facilitates detecting frequency shifts in the carrier frequency of the input signal 135. In some cases, e.g., this information can be used to adjust the device's 100 frequency response to mitigate certain nonlinearities in a radiofrequency link to the device 100 (e.g., frequency nonlinearities in a laser or other components transmitting the input signal 135 to the device 100).

As also shown in FIG. 5, in some embodiments, the method further includes a step 555 of generating a coherent optical reference signal 345 (e.g., from laser 340 configured to emit an optical signal 345 at a predefined or known frequency) and a step 560 of splitting the coherent reference optical signal 345 (e.g., via second beam splitter 350) into the coherent reference optical signals 352, 354 which were optically mixed in step 550 (e.g., via optical mixers 365, 367) with the output signals 335, 337 of the discriminator filter 140.

One skilled in the art would appreciate how the method could be incorporated into a variety of telecommunication processes. For example, when the optical device 100 is an optical receiver in an optical telecommunication system 105 the method can include a step 570 of down-converting an input radiofrequency signal into the frequency-modulated coherent input optical signal 135, and a step 575 up-converting the electrical output signal 330 into an output radiofrequency (RF) signal.

Although the embodiments have been described in detail, those of ordinary skill in the art should understand that they could make various changes, substitutions and alterations herein without departing from the scope of the disclosure.

What is claimed is:

1. An optical device, comprising:
   a Mach-Zehnder interferometer having a first 2×2 optical coupler, a second 2×2 optical coupler, a first optical arm, and a second optical arm, the first and second arms connecting corresponding pairs of optical ports of the first and second 2×2 optical couplers, and wherein said second optical arm has a longer optical path than said first arm;
   one or more optical resonators optically coupled to said first optical arm; and
   an optical splitter coupled to deliver a portion of an input optical signal to one port of the first 2×2 optical coupler and to deliver a remaining portion of the input optical signal to one port of the second optical coupler.

2. The optical device of claim 1, wherein the optical splitter is configured to deliver the remaining portion to the second 2×2 optical coupler with a phase shift with respect to the portion delivered to the first 2×2 optical coupler, the phase shift being between π/4 and 3π/4.

3. The device of claim 1, wherein a said feedback optical path length of each of said one or more optical resonators is about twice a difference in length of said longer optical path of said second arm and said optical path of said first arm.

4. The device of claim 1, wherein a free spectral range of said device is less than or equal to about two times a linear bandwidth operation of said device.

5. The device of claim 1, wherein each of said one or more optical resonators include a tunable coupler and a phase shifter.

6. The device of claim 1, wherein four to five of said one or more optical resonators are optically coupled to said first arm.

7. The device of claim 1, further including a second set of said one or more optical resonators that are optically coupled to said second arm.

8. The device of claim 1, wherein said optical splitter is configured to divide a frequency-modulated coherent said input optical signal into two optical input signals, each of said two optical input signals being separately coupled to one of first and second tunable balanced Mach-Zehnder interferometers through first and second input waveguides, respectively, said first and second tunable balanced Mach-Zehnder interferometers being coupled to first ends and second ends of said first and second arms, respectively.

9. The device of claim 8, further including a 180 degree phase shifter optically coupled to one of said first or second input waveguides.

10. The device of claim 8, further including first and second photo-detectors, wherein said first and second photo-detectors are each configured to receive different portions of an amplitude-modulated coherent output optical signal from said first and second tunable balanced Mach-Zehnder interferometers.

11. The device of claim 10, wherein said first and second photo-detectors are configured to generate an electrical output signal that is proportional to said amplitude-modulated coherent output optical signals.

12. The device of claim 10, further including a reference laser configured to transmit a coherent reference optical signals having a predefined reference frequency to first and second optical mixers that are coupled to said first and second photo-detectors, wherein different portions of said coherent reference optical signals are optically coupled said different portions of said amplitude-modulated coherent output optical signal transmitted to said first and second optical mixers.

13. The device of claim 12, wherein a phase of an electrical output signal from said first and second photo-detectors changes as a function of a difference between said predefined reference frequency and a frequency of said amplitude-modulated coherent output optical signal.

14. The device of claim 1, wherein said optical device is configured as an optical receiver in a telecommunication system.

15. A method of using an optical device, comprising:
sending a frequency-modulated coherent input optical signal to first and second tunable balanced Mach-Zehnder interferometers;
transmitting said frequency-modulated coherent input optical signal from said first and second tunable balanced Mach-Zehnder interferometers to first and second arms of an imbalanced Mach-Zehnder interferometer, wherein
one or more all-pass tunable ring resonators are optically coupled to said first arm, and
said second arm has a longer optical path than an optical path of said first arm,
adjusting one or more of phase shifts, coupling strengths, or resonance frequencies of said one or more all-pass tunable ring resonators;
adjusting a coupling strength of said first and second tunable balanced Mach-Zehnder interferometers; and
transferring an amplitude-modulated coherent output optical signal out of said first and second tunable balanced Mach-Zehnder interferometers,
wherein said amplitude-modulated coherent output optical signal is linearly related to said frequency-modulated coherent input optical signal.

16. The method of claim 15, further including splitting said frequency-modulated coherent input optical signal into two frequency-modulated coherent input optical signals prior to said sending.

17. The method of claim 15, further including phase shifting of one of said frequency-modulated coherent input optical signals by 180 degrees prior to said sending.

18. The method of claim 15, further including:
transmitting different portions of said amplitude-modulated coherent output optical signals to first and second photo-detectors, and
transmitting from said first and second photo-detectors, an electrical output signal that is proportional to said amplitude-modulated coherent output optical signals.

19. The method of claim 18, further including optically mixing said different portions of said amplitude-modulated coherent output optical signals with coherent reference optical signals prior to said transmissions to said to first and second photo-detectors.

20. The method of claim 19, further including splitting a coherent reference optical signal into said coherent reference optical signals, wherein different one of said coherent reference optical signals are subject to said optical mixing with said different portions of said amplitude-modulated coherent output optical signals.

21. The method of claim 18, further including down-converting an input radiofrequency signal into said frequency-modulated coherent input optical signal and up-converting said electrical output signal into an output radiofrequency signal.

* * * * *